United States Patent
Kauhanen et al.

(10) Patent No.: US 10,392,204 B2
(45) Date of Patent: Aug. 27, 2019

(54) EQUIPMENT FOR MOVING A PALLET

(71) Applicant: ACTIW OY, Naarajarvi (FI)

(72) Inventors: Juho Kauhanen, Pieksamaki (FI); Janne Auvinen, Pieksamaki (FI); Eetu Mustonen, Pieksamaki (FI)

(73) Assignee: Actiw Oy, Naarajarvi (FI)

( * ) Notice: Subject to any disclaimer, the term of this patent is extended or adjusted under 35 U.S.C. 154(b) by 0 days.

(21) Appl. No.: 15/774,616

(22) PCT Filed: Dec. 1, 2016

(86) PCT No.: PCT/FI2016/050849
§ 371 (c)(1),
(2) Date: May 9, 2018

(87) PCT Pub. No.: WO2017/093613
PCT Pub. Date: Jun. 8, 2017

(65) Prior Publication Data
US 2018/0319610 A1 Nov. 8, 2018

(30) Foreign Application Priority Data
Dec. 1, 2015 (FI) .................................... 20155902

(51) Int. Cl.
*B65G 67/20* (2006.01)
*B65G 39/20* (2006.01)
(Continued)

(52) U.S. Cl.
CPC ............. *B65G 67/20* (2013.01); *B65G 17/26* (2013.01); *B65G 39/20* (2013.01); *B65G 67/24* (2013.01); *B65G 2201/0267* (2013.01)

(58) Field of Classification Search
CPC ........ B65G 17/26; B65G 17/40; B65G 39/20; B65G 67/08; B65G 67/20; B65G 67/24; B65G 2201/0267
See application file for complete search history.

(56) References Cited

U.S. PATENT DOCUMENTS 3,337,066 A * 8/1967 Reed .................. B65G 67/20
414/345
3,930,587 A 1/1976 Bliss
(Continued)

FOREIGN PATENT DOCUMENTS

| EP | 867400 | 9/1998 |
|----|--------|--------|
| EP | 1967484 | 9/2008 |
| EP | 1963217 | 9/2013 |
| WO | 2011/142662 | 11/2011 |

OTHER PUBLICATIONS

International Search Report, International Application No. PCT/FI2016/050849, dated Mar. 1, 2017.
English language abstract of EP 1967484.
English language abstract of EP 867400.

*Primary Examiner* — Gene O Crawford
*Assistant Examiner* — Keith R Campbell
(74) *Attorney, Agent, or Firm* — Fildes & Outland, P.C.

(57) ABSTRACT

Equipment for moving a pallet includes lifting elements arranged to be fitted under the pallet. The lifting element includes a chain, which is formed of vertebrae pivoted to each other. A rolling element equipped with a lifting functionality is arranged in at least some of the vertebrae. The equipment includes a frame, underneath which a resting station for the lifting element is arranged. In addition, the chain has one degree of freedom, which is downwards, so that the chain can be taken from on top of the frame to the resting station under the frame.

15 Claims, 4 Drawing Sheets

(51) Int. Cl.
*B65G 67/24* (2006.01)
*B65G 17/26* (2006.01)

(56) References Cited

U.S. PATENT DOCUMENTS

| | | | | |
|---|---|---|---|---|
| 4,164,338 | A * | 8/1979 | Myron | B64C 1/20 |
| | | | | 193/35 F |
| 4,844,681 | A * | 7/1989 | Pierre | B65G 67/20 |
| | | | | 414/398 |
| 4,979,863 | A * | 12/1990 | Kavieff | B65G 67/20 |
| | | | | 198/774.1 |
| 5,186,596 | A | 2/1993 | Boucher et al. | |
| 5,374,151 | A * | 12/1994 | Matthews | B65G 67/20 |
| | | | | 414/343 |
| 6,655,893 | B2 * | 12/2003 | Kelly | B65G 67/08 |
| | | | | 198/370.01 |
| 9,688,317 | B1 * | 6/2017 | Berger | B62D 33/042 |
| 2004/0086363 | A1 * | 5/2004 | Rohr | B65G 67/20 |
| | | | | 414/398 |
| 2006/0260913 | A1 * | 11/2006 | Wolf | B65G 41/008 |
| | | | | 198/812 |
| 2008/0050216 | A1 * | 2/2008 | Bolzani | B65G 57/005 |
| | | | | 414/791.6 |
| 2016/0236881 | A1 * | 8/2016 | Ito | B65G 67/04 |

* cited by examiner

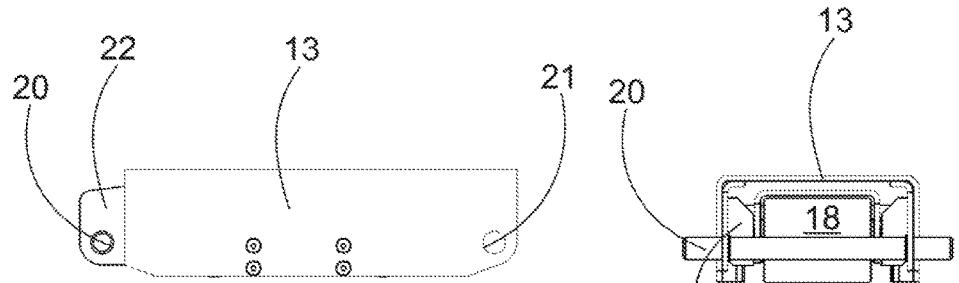 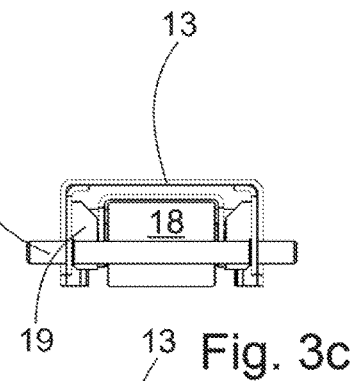
Fig. 3a   Fig. 3c
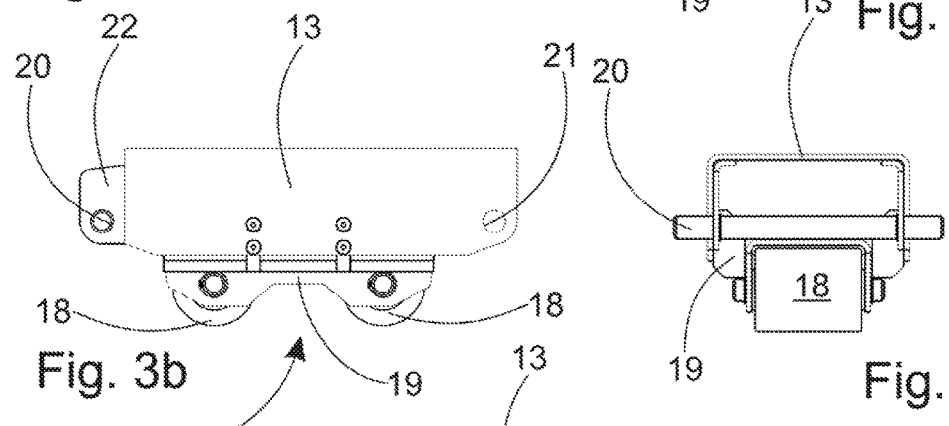 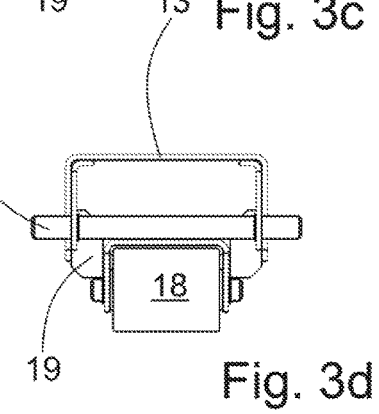
Fig. 3b   Fig. 3d
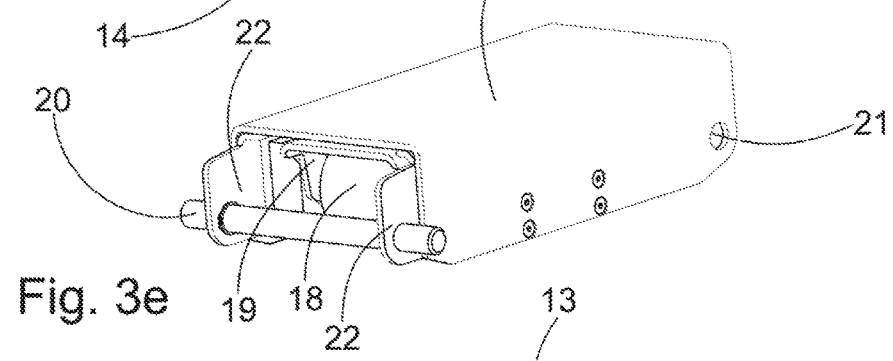
Fig. 3e
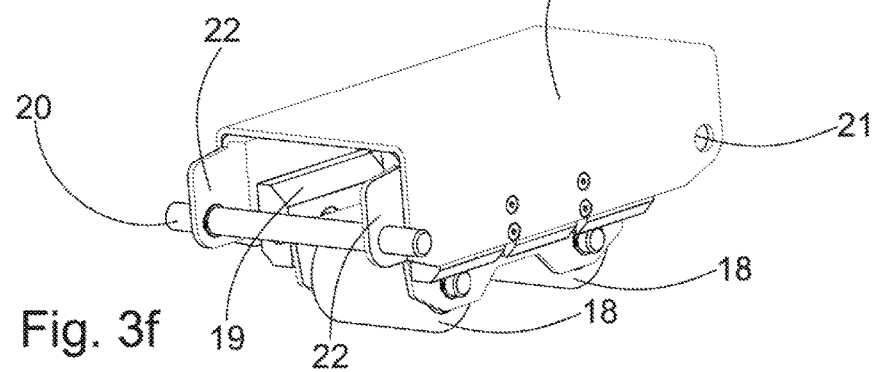
Fig. 3f

US 10,392,204 B2

EQUIPMENT FOR MOVING A PALLET

CROSS-REFERENCE TO RELATED APPLICATION

This application claims benefit of priority from International Patent Application No. PCT/FI2016/050849 filed Dec. 1, 2016, which claims benefit of priority from Finland Patent Application No. 20155902 filed Dec. 1, 2015, both of which are incorporated by reference in their entirety.

FIELD OF THE INVENTION

The invention relates to an equipment for moving a pallet, which equipment includes lifting elements arranged to be fitted under the pallet, the lifting element being a chain, which is formed of vertebrae pivoted to each other, rolling element equipped with a lifting functionality being arranged in at least some of the vertebrae.

BACKGROUND OF THE INVENTION

Conveyor solutions are known for the unloading of a load space, which are installed permanently on the bottom of the load space. Part of the capacity of the load space and the load-bearing capacity of the vehicle is then lost. In some embodiments, even the floor of the load space or even the structure of the vehicle's chassis needs to be altered, so that lifting beams can be put under the load. In addition, when an unloading operation is desired a conveyor must be installed on the bottom of the load space, which represents high costs. There also exist various automatic fork-lift trucks or manipulators, which, on the basis of precise positioning, machine vision, or both can move one, or a maximum of two, pallets at a time out of the load space. The load can also be without a pallet, for example, large paper reels. An automatic fork-lift truck is expensive and the unloading of the load space is slow.

EP application publication 1967484 discloses a chain-like lifting element, which can be taken under a pallet, more specifically inside a pallet. The lifting element is formed of motorized units, which are attached to each other by flexible links. The distance of the units from each other can then be adjusted. In the embodiments, two parallel lifting elements are taken under a pallet. Then by operating the lifting elements the pallet is lifted off the base and the motorized units are used to take the pallet into the load space. In the load space, the pallet is lowered and the lifting elements are taken out of the load space. The pallet can be retrieved from the load space in a similar manner. The lifting element described is complex and demands a great deal of space. Each motorized unit is also complex and requires energy to be conducted through the flexible links.

SUMMARY OF THE INVENTION

The invention is intended to create a new type of equipment for moving a pallet, which required less space than previously and which is suitable for moving different kinds of pallet in different kinds of transport system. The characteristic features of the equipment according to the present invention includes a lifting element arranged to be fitted under the pallet. The lifting element includes a chain which is formed of vertebra pivoted to each other including a rolling element equipped with a lifting functionality arranged in at least some of the vertebrae and characterized in that the equipment includes a frame under which a resting station is arranged for the lifting element, and the chain has one degree of freedom, which is downwards so that the chain can be taken from on top of the frame to the resting station under the frame. The equipment according to the invention provides for the movement of different kinds of pallets into and out of different kinds of standard load spaces. In addition, the lifting elements can easily be put into a resting station, wherein the equipment takes up little space and the lifting elements remain clean. At the same time, the lifting elements are taken out of the path of the load.

BRIEF DESCRIPTION OF THE DRAWINGS

In the following, the invention is described in detail with reference to the accompanying drawings depicting one embodiment of the invention, in which FIG. 3b shows a side view of the vertebra of FIG. 3a, in the upper position, FIG. 3c shows a front view of the vertebra of FIG. 3a, in the lower position, FIG. 3d shows a front view of the vertebra of 3a, in the upper position, FIG. 3e shows the vertebra of FIG. 3a seen at an angle from in front, in the lower position, FIG. 3f shows the vertebra of FIG. 3a seen at an angle from in front, in the upper position.

DETAILED DESCRIPTION OF THE INVENTION

Figure 1:
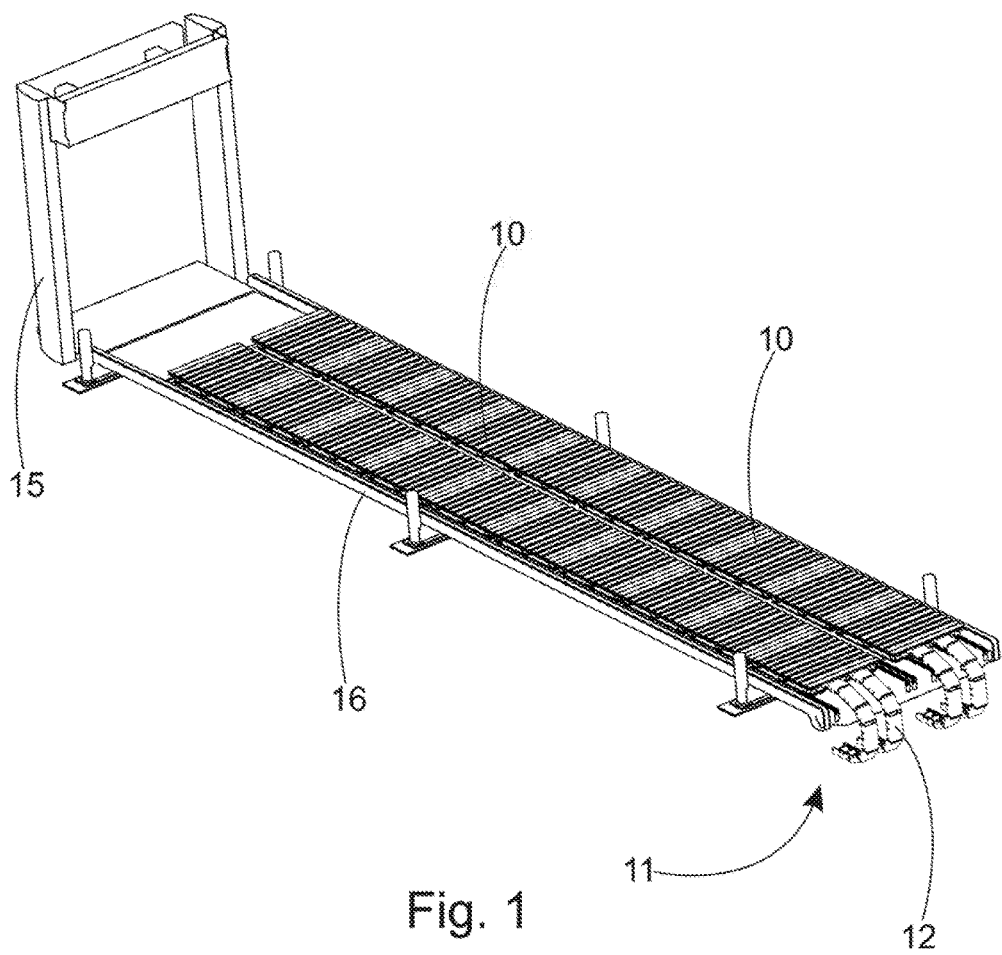
FIG. 1 shows the equipment according to the invention, seen at an angle from above.

FIG. 1 shows the equipment according to the invention. The basis of the equipment can be a loading device developed by the applicant, which utilizes a transfer plate. The loading device is disclosed in, for example, European patent number 1963217. On the other hand, the equipment can have its own frame and the equipment can be operated without a transfer plate. Stated generally, the equipment according to the invention is intended for moving pallets, for example, for emptying a load space of a load arranged on pallets or correspondingly moving pallets into the load space, i.e. loading the load space. The figures show only the empty pallets 10, on which the goods to be transported are set. Thus, the load to be moved into the load space consists of pallets and goods set upon them. The equipment includes lifting elements 11 arranged to be fitted under a pallet 10. The lifting elements 11 preferably extend over the entire length of the load space. In other words, the length of a lifting element 11 corresponds essentially to the length of the load space 24. Thus, the entire load of the load space can be handled at one time. In the invention, the lifting element 11 is a chain 12, which is formed of vertebrae 13 pivoted to each other. In addition, a rolling element 14 equipped with a lifting functionality is arranged from at least some of the vertebrae 13. The chain shown is sufficiently rigid for it to be able to be pushed under the pallets and then for the entire load to be lifted at one time from the floor of the load space and to be pulled out of the load space. The chain is also so rigid that it can used to push the pallets lifted off the base into the load space.

In FIG. 1, the load space, such as, for example, a container or the platform of a truck, is a continuation on the left-hand side of the equipment. The gate 15 of the equipment attaches to the opening of the load space. Here, the pallets 10 are already pulled out on top of the frame 16 belonging to the equipment. The gate is needed if a transfer plate is used. In that case, the gate is used to support the load in place, when transfer plate is pulled out from under the load. The load space and frame are preferably attached to each other for the duration of loading. This avoids creating differences in height, i.e. steps.

The equipment according to the invention includes a frame 16, under which a resting station 23 is arranged for the lifting element 11. In addition, the chain 12 has one degree of freedom, which is downwards so that the chain 12 can be taken from on top of the frame 16 to the resting station 23 under the frame 16. Thus the degree of freedom of the chain 12 is preferably downwards. The chain can then be led under the frame 16, where the resting station is arranged for the lifting element 11. Thus in the resting station 23, the chain 12 is rotated through 180° compared to the operating position. In practice, the chain is flexible in one direction, but rigid in the opposite direction. In other words, the chain can be straight, but not bend upwards. The chain then forms a rigid operational beam, on which the pallets can be lifted and both pulled and pushed. In practice, the entire chain can be taken to the resting station. The top of the frame then remains free, so that the pallets together with the goods can be moved for further processing. Correspondingly, the pallets can be brought, for example, from a store to on top of the frame and from there taken by the chains into the load space.

Figure 2A:
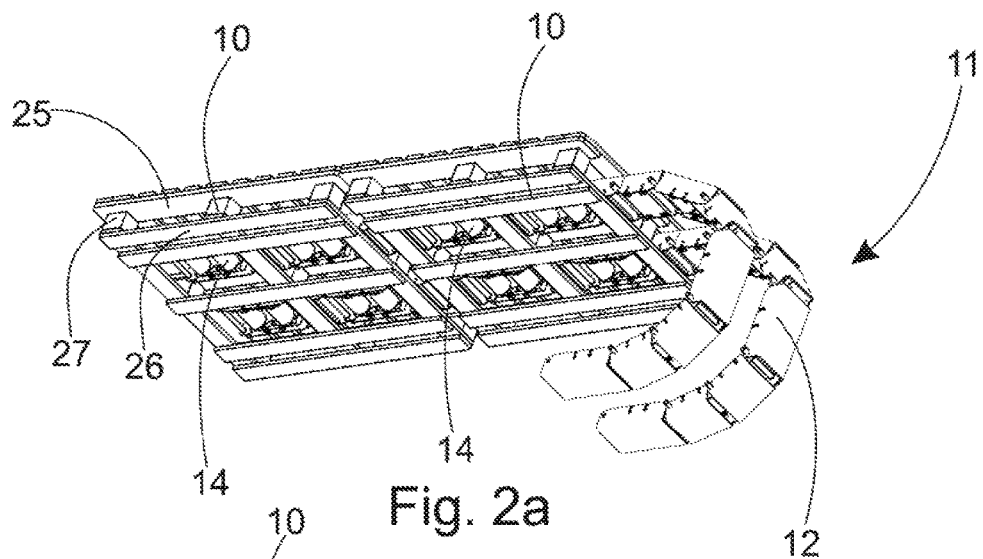
FIG. 2a shows some of the lifting elements of the equipment, seen at an angle from below.
Figure 2B:
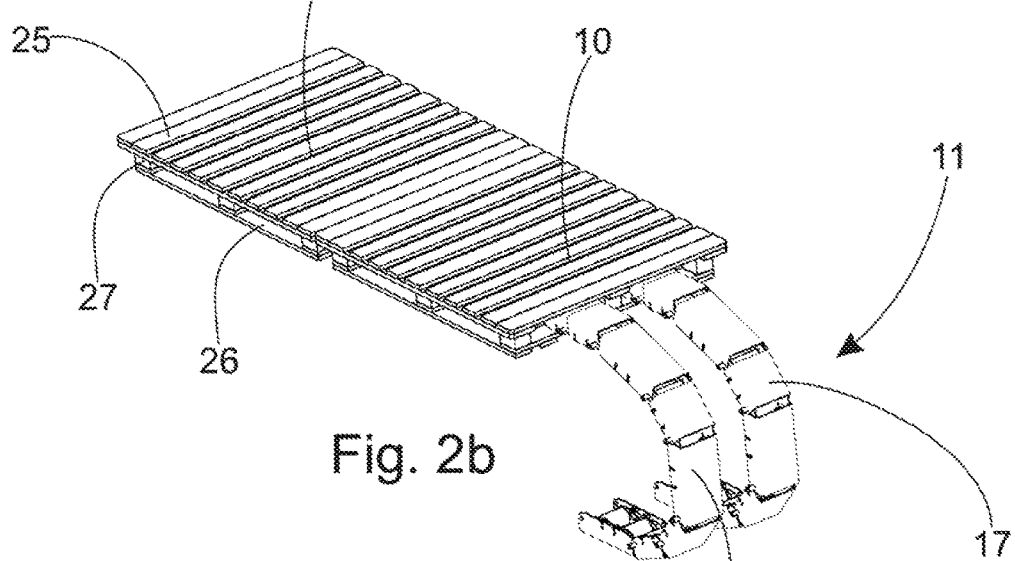
FIG. 2b shows the lifting elements of FIG. 2a, seen at an angle from above.
Figure 2C:
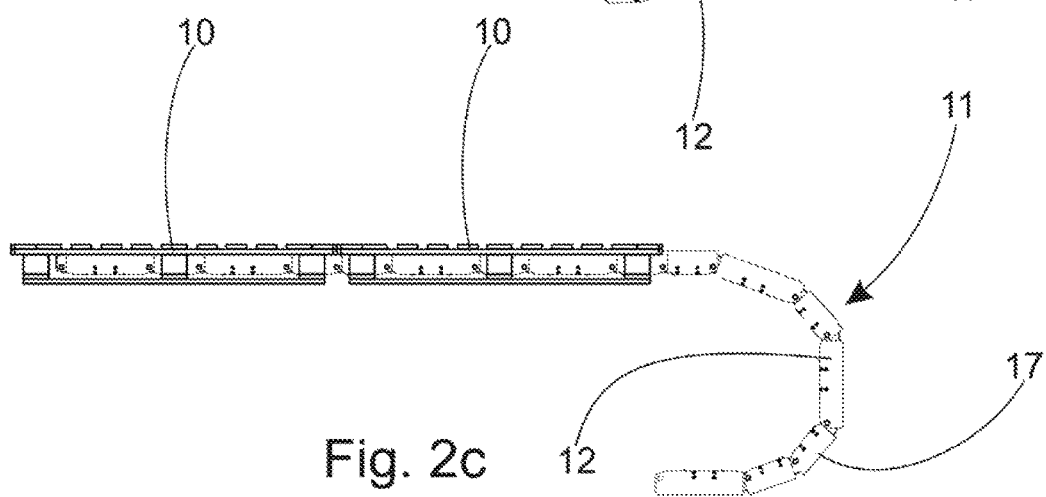
FIG. 2c shows a side view of the lifting elements of FIG. 2a, FIG. 3a shows a side view of an individual vertebra of a lifting element according to the invention, in the lower position.

FIGS. 2*a*-2*c* show some of the pallets 10 and two chains 12. The width of a pallet 10 is generally from one to three chains. The low chains fit under the pallets, more specifically inside the pallet. The chains are even able to progress over the pallets' transverse planks between the foot' structures. A vertebra 13 equipped with a rolling element 14 is preferably followed by a shorter or longer intermediate vertebra 17 without a rolling element. A rolling element will then not occur at the location of the transverse planks; instead they will be situated at an open location (FIG. 2*a*). There is one intermediate vertebra or there can be several consecutively.

The pallets are raised with the aid of the lifting functionality. In practice, the pallets are raised from the structure of the chain using some operating device, such as, for example, on rollers pushed by compressed air. Here, the rolling element 14 includes two rollers 18, which are arranged consecutively. The vertebra then rises in a straight line and the chain is given a sufficient load-bearing capacity. Generally, there are one or more rollers in a vertebra, more specifically from one to four. Generally, the rolling elements rotate freely, which simplifies the construction of the vertebra. The rollers can also be arranged consecutively, adjacently, or consecutively and adjacently. In practice, sufficient load-bearing capacity can be achieved in the chain with even one roller to a vertebra. Thus two or even more rollers will easily fit in the length of a vertebra. In addition, instead of a single roller, there can be several narrower wheels or a disc on the same shaft. When the load, i.e. the load together with the pallets is being carried by the chains, they are pulled by an operating device out of the load space onto the frame and lowered onto the conveyor on top of it. The operating device can be, for example, similar to that with which the transfer plate is moved. Finally, the chains are run under the frame into the resting station from between the foot structures of the pallets. The pallets on top of the frame can be moved to another conveyor for further processing in an automatic warehouse, by a fork-lift truck/automatic truck to a shelf store, or to production. Pallets can be moved in the longitudinal direction of the equipment and, if desired, also to the side. Generally, the equipment includes at least two chains, which are pushed under the pallets, and by which the load and pallets are raised. Thanks to the rolling elements, the load can be pulled out of the load space. Similarly, a load can be formed on top of the frame from pallets and the chains run under the pallets from the resting station. The pallets are then lifted off the frame and the whole load is pushed into the load space. In the entire travel of a pallet there can be a free space, so that rolling elements equipped with a lifting functionality can even be used in each vertebra.

The chains described above can be combined with the loading device disclosed in the aforementioned European patent number 1963217. For example, pallets, which by using a suitable pushing device are pushed on top of roller rows formed of freely rotating rollers, are brought to the loading device using a conveyor arrangement. The roller rows are attached to the transfer plate. The load is formed on the transfer plate, which is pushed into the load space by the loading device. The gate is closed and the transfer plate pulled out of the load space, so that the pallets and thus the load remain in the load space. By arranging the chains according to the invention in connection with the loading device, it is surprisingly possible to use the same device also to empty the load space of pallets. When emptying, the transfer plate is on top of the frame and the chains according to the invention are run between the roller rows into the load space and under the pallets that are there. With the aid of the lifting functionality the pallets are lifted off the bottom of the load space and pulled out of the load space on top of the roller rows of the transfer plate. Finally, the chains are run under the frame to the resting station. The pallets can be moved off the transfer plate, for example, from the side using a fork-lift truck or using a suitable pusher, the pallets are pushed on the roller rows onto a conveyor that is a continuation of the loading device. Loading and unloading operations can then be combined in the same frame.

FIGS. 3*a*-3*f* show a vertebra 13 of the chain according to the invention. The vertebra is longer than it is wide. In addition, the vertebra is preferably lower than it is wide. A vertebra is then formed that is short, but sufficiently wide and a chain of which is formed that is sturdy, but with a small radius of curvature in the direction of flexing. In practice, the radius R of curvature of the chain is 200-800 mm, so that it fits easily under the frame. The radius of curvature is also reduced by using a short intermediate vertebra. There can be differently-sized vertebrae in the chain, by which the chain can be easily adapted according to the loading pattern. For example, a pallet can be set longitudinally or transversely. In practice, the lifting height of the vertebrae 13 is 5-50 mm, preferably 10-30 mm. Pallets can then be raised sufficiently from the base.

The basic shape of the vertebra 13 is a C. The structure is simple and sturdy. The rolling elements 14 are fitted into a common carrier 19, which moves relative to the vertebra 13. The lifting functionality is implemented using a suitable operating element, which is fitted between the vertebra and the carrier. In the lower position, the rollers 18 go inside the vertebra 13 and in the upper position the rollers protrude nearly entirely outside the vertebra. A sufficient lifting height is then achieved using the chain. The vertebrae are attached to each other simply by a pivot pin 20, holes 21 corresponding to which being in the other end of the vertebra 13. The lugs 22 for the pivot pin 20 go inside the vertebra 13, so that in the lifting stage the chain stiffens also laterally. In other words when loaded and lifted the chain stiffens, so that it is also possible to push it. The chain is operated using a suitable operating device, by which the chain is both pushed and pulled. The vertebrae can then be non-operating, which simplifies the construction of the chain. For example, the chain can consist of differently-sized vertebrae, according to each loading pattern. Generally, in a specific system similar pallets and loading patterns are used repeatedly, so that the composition of the chain need be arranged correctly only once.

Figure 4A:
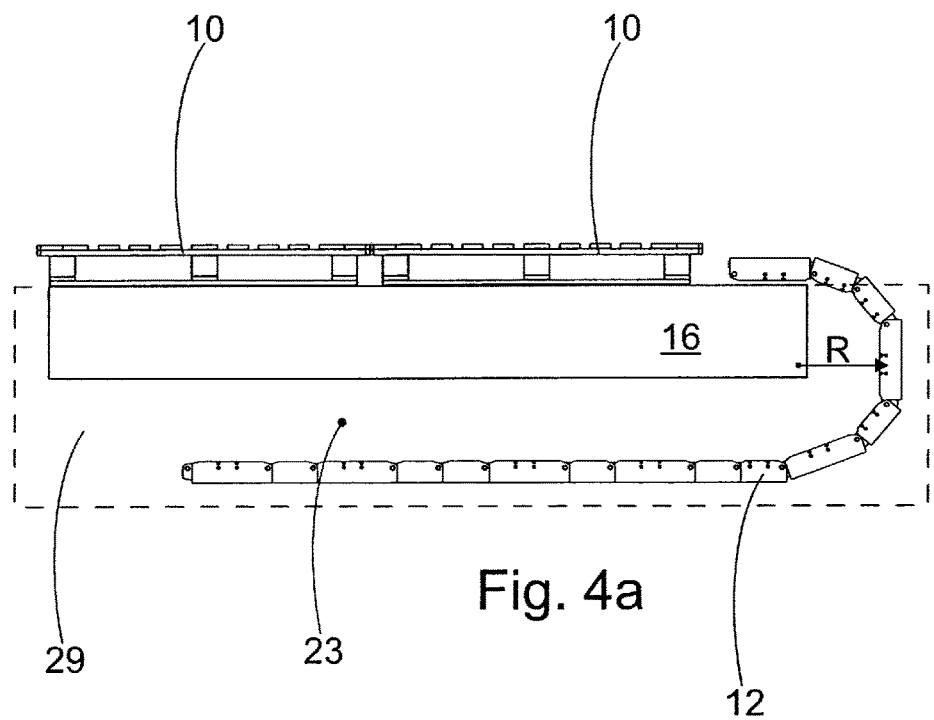
FIG. 4a shows a schematic drawing of the resting station of the lifting element.

In FIG. 4*a*, two pallets 10 have been placed on top of the frame 16. The chain 12 is almost entirely in the resting station 23, which is also shielded from the side. The shield construction 29 is shown schematically by a broken line. In practice, the chain 12 is arranged to be set between the deck 25 and base 26 belonging to the pallet 10. There are intermediate supports 27 between the deck 25 and the base 26. The chain can then go over the lower base plank, so that different types of pallet can be used. Generally, the main parts of a pallet are a deck, intermediate supports, and a base. Generally, in a timber pallet the intermediate supports or one long intermediate support and the lower base plank form a longitudinal foot. There are usually three feet in a pallet.

Figure 4B:
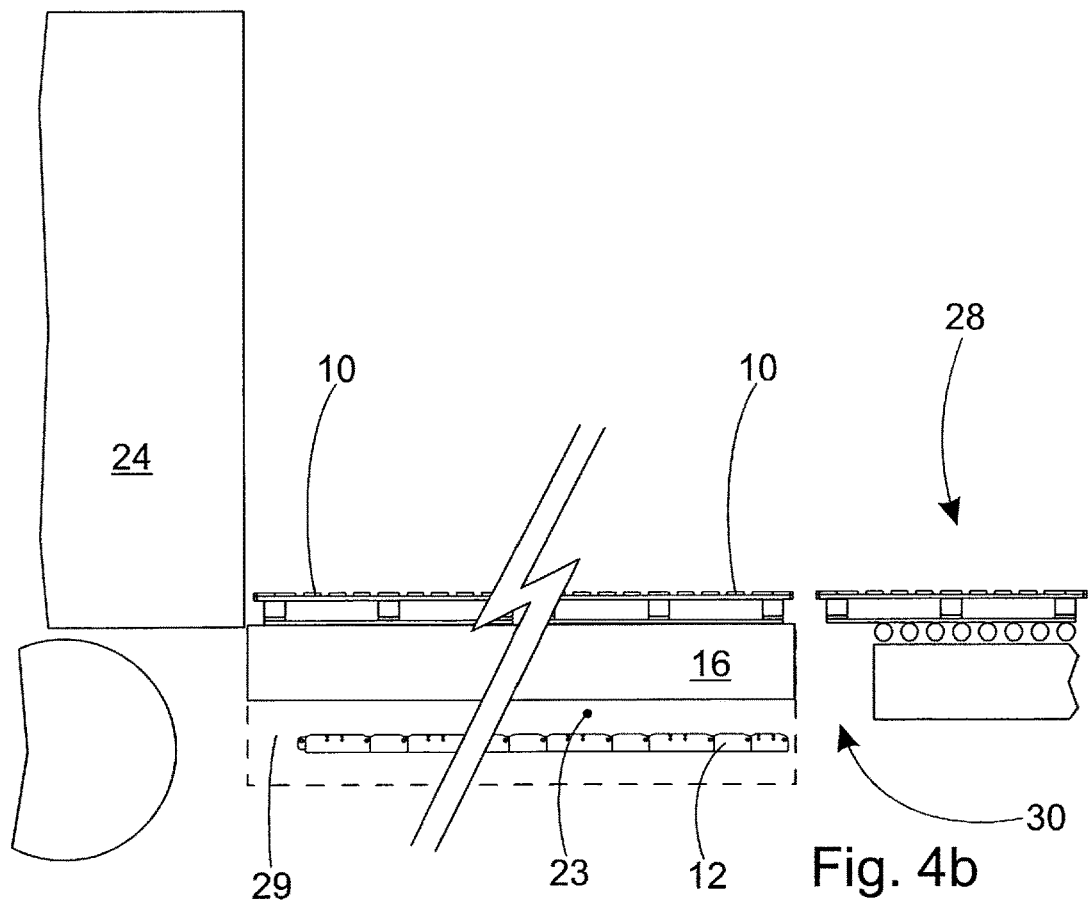
FIG. 4b shows an example of an embodiment of the equipment according to the invention.

In FIG. 4*b*, the equipment is arranged as a continuation of a conveyor system 28. Of the conveyor system 28, what is shown here is only part of the conveyor, on which pallets are brought to the frame 16 or taken off the frame 16. The chain 12 is entirely under the frame 16 in the resting station 23 and a load of pallets is formed on top of the frame 16. Here too the goods are not shown. Preferably the frame 16 is joined to the load space 24 and the chains are run from the resting station 23 to the inside of the pallets 10. The pallets 10 are then lifted off the frame and pushed into the load space 24.

Unloading takes place in the opposite manner. The load space 24 is connected to the frame 16 and the chains are run from the resting station 23 to beneath the pallets in the load space. The pallets are lifted off the floor of the load space and the load is pulled on top of the frame. After the pallets are lowered, the chains are run under the frame to the resting station and the pallets are transferred to the conveyor system. There is a suitable gap 30 between the frame and the conveyor system, from which the chains can be taken to the resting station. The gap is closed in such a way that the pallets can be taken from the conveyor system to the frame and vice versa. Thanks to the resting station, only a frame the length of the load space is needed, on which the load is formed. In addition, the entire load can be handled at one time, which shortens the standing time of the transport means. The construction of the chain is simple and sturdy. In addition, the composition of the chain can be easily adapted to the loading pattern by simply choosing suitable vertebrae.

The invention claimed is:

1. Equipment for moving a pallet, the equipment comprising:
    lifting elements arranged to be fitted under the pallet, each lifting element being a chain, which is formed of a plurality of vertebra pivotally connected to each other,
    a rolling element equipped with a lifting functionality, the rolling element being arranged in at least one of the vertebra, and
    a frame, under which a resting station is arranged for the lifting elements,
    the chain having one degree of freedom, such that from a straight disposition the chain is only flexible in a downward direction and is not flexible past a straight line in an upwards direction, so that the chain is taken from on top of the frame to the resting station under the frame.

2. Equipment according to claim 1, characterized in that the vertebra in the chain have a plurality of different lengths.

3. Equipment according to claim 1, characterized in that the rolling element includes from one to four rollers, which are arranged consecutively.

4. Equipment according to claim 1, characterized in that one of the vertebra in the chain is equipped with the rolling element, and an adjacent one of the vertebra does not include a rolling element and is shorter or longer in length than the vertebra that includes the rolling element.

5. Equipment according to claim 1, characterized in that there are 1-3 chains over the width of the pallet.

6. Equipment according to claim 1, characterized in that each said vertebra has a length and a width, the length being greater than the width.

7. Equipment according to claim 1, characterized in that each said vertebra generally has a C-shape.

8. Equipment according to claim 1, characterized in that the rolling elements are freely rotatable.

9. Equipment according to claim 1, characterized in that the lifting height of each said vertebra is 5-50 mm.

10. Equipment according to claim 1, characterized in that in a lower position of the vertebra including the rolling element, the rolling element is disposed entirely inside the said vertebra.

11. Equipment according to claim 1, characterized in that the chain is arranged to be set between a deck and a base of the pallet.

12. Equipment according to claim 1, characterized in that the length of the chain corresponds to the length of a load space.

13. Equipment according to claim 1, characterized in that, in the resting station, the chain is rotated 180°.

14. Equipment according to claim 1, characterized in that the radius R of curvature of the chain is 200-800 mm.

15. Equipment according to claim 1, characterized in that the equipment is arranged as a continuation of a conveyor system.

* * * * *